(12) United States Patent
Chang et al.

(10) Patent No.: US 12,299,753 B2
(45) Date of Patent: *May 13, 2025

(54) METHOD, SYSTEM AND RECORDING MEDIUM FOR MANAGING OFFICIAL ACCOUNT

(71) Applicant: LY Corporation, Tokyo (JP)

(72) Inventors: So Young Chang, Seongnam-si (KR); Hyun Jeong Lee, Seongnam-si (KR)

(73) Assignee: LY Corporation, Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 17/903,266

(22) Filed: Sep. 6, 2022

(65) Prior Publication Data

US 2023/0005083 A1    Jan. 5, 2023

Related U.S. Application Data

(63) Continuation of application No. 14/840,971, filed on Aug. 31, 2015, now Pat. No. 11,468,520.

(30) Foreign Application Priority Data

Dec. 19, 2014    (KR) ........................ 10-2014-0184821

(51) Int. Cl.
| | | |
|---|---|---|
| *G06Q 50/00* | (2024.01) | |
| *G06Q 50/40* | (2024.01) | |
| *G06Q 50/50* | (2024.01) | |
| *H04L 51/42* | (2022.01) | |
| *H04L 51/48* | (2022.01) | |

(Continued)

(52) U.S. Cl.
CPC ............ *G06Q 50/01* (2013.01); *G06Q 50/40* (2024.01); *H04L 51/48* (2022.05); *H04L 67/306* (2013.01); *H04M 15/765* (2013.01); *G06Q 50/50* (2024.01); *H04L 51/42* (2022.05)

(58) Field of Classification Search
CPC ...... G06Q 50/01; G06Q 50/30; H04L 67/306; H04L 51/48; H04L 51/42; H04M 15/765
See application file for complete search history.

(56) References Cited

U.S. PATENT DOCUMENTS

| | | | | |
|---|---|---|---|---|
| 9,253,631 | B1* | 2/2016 | White | H04M 1/72457 |
| 9,477,758 | B1* | 10/2016 | Tong | G06F 16/951 |
| 10,114,802 | B2 | 10/2018 | Huang | |

(Continued)

FOREIGN PATENT DOCUMENTS

| | | |
|---|---|---|
| KR | 2013-0052589 A | 5/2013 |
| KR | 2014-0037268 A | 3/2014 |
| KR | 2014-0059000 A | 5/2014 |

OTHER PUBLICATIONS

Korean Office Action dated May 4, 2016 issued in corresponding Korean Application No. 10- 2014-0184821.

*Primary Examiner* — Andrew B Whitaker
*Assistant Examiner* — Shaun D Sensenig
(74) *Attorney, Agent, or Firm* — Harness, Dickey & Pierce, P.L.C.

(57) ABSTRACT

A method, system, and recording medium for managing official accounts is disclosed. An official account management method includes the steps of setting a relation between official accounts that are accounts of sponsors on a messenger, and managing the official accounts by classifying the official accounts in a related account group in accordance with the relation between the official accounts.

16 Claims, 13 Drawing Sheets

(51) Int. Cl.
*H04L 67/306* (2022.01)
*H04M 15/00* (2024.01)

(56) References Cited

U.S. PATENT DOCUMENTS

| | | | |
|---|---|---|---|
| 2001/0033298 A1* | 10/2001 | Slotznick | G06Q 10/107 |
| | | | 715/758 |
| 2007/0244872 A1 | 10/2007 | Hancock | |
| 2009/0187623 A1 | 7/2009 | Narayanaswami et al. | |
| 2009/0254971 A1* | 10/2009 | Herz | G06Q 10/10 |
| | | | 726/1 |
| 2010/0287282 A1 | 11/2010 | MacLaughlin | |
| 2012/0323695 A1* | 12/2012 | Stibel | G06Q 30/02 |
| | | | 705/14.66 |
| 2013/0346213 A1* | 12/2013 | Powell | G06Q 30/0241 |
| | | | 705/14.66 |
| 2014/0032684 A1* | 1/2014 | Chung | H04L 12/1822 |
| | | | 709/206 |
| 2014/0173003 A1* | 6/2014 | Van | H04L 51/046 |
| | | | 709/206 |
| 2014/0337427 A1* | 11/2014 | Hamada | H04L 67/75 |
| | | | 709/204 |
| 2016/0070770 A1* | 3/2016 | He | G06F 16/9535 |
| | | | 709/204 |
| 2016/0110722 A1 | 4/2016 | Reddy et al. | |

* cited by examiner

FIG. 6

|   | Family brand (relative account group) | Code identifier |
|---|---|---|
| 1 | Brand CC | XXX |
| 2 | Brand CV | |
| 3 | Brand DK | |
| 4 | Brand XC | |
| 5 | Brand XX | |
| 6 | Brand XY | |

METHOD, SYSTEM AND RECORDING MEDIUM FOR MANAGING OFFICIAL ACCOUNT

CROSS-REFERENCE TO RELATED APPLICATIONS

This U.S. non-provisional application is a continuation of and claims the benefit of priority under 35 U.S.C. §§ 120/121 to U.S. patent application Ser. No. 14/840,971, filed Aug. 31, 2015, which claims priority under 35 U.S.C. § 119 to Korean Patent Application No. 10-2014-0184821 filed Dec. 19, 2014, in the Korean Intellectual Property Office, the entire contents of each of which are hereby incorporated by reference.

BACKGROUND

Example Embodiments of the inventive concepts described herein relate to technology for managing official accounts in an instant messenger.

An instant messenger, as a general communication toll, is software capable of transceiving (transmitting and receiving) a message or data in real time. Through such an instant messenger, a user is able to register the other user on the messenger and even exchange a message with the other user in real time.

These messenger functions are going to generalization even in mobile environment with portable communication terminals, as well as in personal computers (PCs).

To exchange messages with the other user, a user needs to add a friend list (or buddy list) of a messenger corresponding thereto. This process is called "friend addition" or "buddy addition" by which main addresses or telephone numbers may be used to connect a user with the other user as a friend or buddy.

As an example for reference art, Korean Patent Publication No. 10-2010-0025859 (Published on Mar. 10, 2010) discloses the technology of automatically adding friends in an instant messenger service.

SUMMARY

Example embodiments of the present inventive concepts include an official account management method comprising: setting a relation between official accounts that are accounts of sponsors on a messenger; and managing the official accounts by classifying the official accounts in a related account group in accordance with the relation between the official accounts.

The setting may further include allocating a code identifier, which indicates the relation between the official accounts, to each of the official accounts.

The setting may further include setting the relation between the official accounts in accordance with at least one of marketing agreement, state and district, business category, family brand between sponsors.

The setting may further include proposing an official account of a corresponding group between official accounts belonging to the related account group for a user.

The setting may further include proposing another official account of a corresponding group to a user if the user adds a specific official account belonging to the related account group to a friend list.

The managing may further include proposing another official account of a corresponding group to a user if a specific official account belonging to the related account group is included in a friend list of the user.

The managing may further include excluding an official account, which belongs to the related account group and has been refused by the user for friend addition, from targets of proposal.

The managing may further include providing a benefit to the user if the user adds official accounts of the related account group in a number larger than a predetermined number to friends.

The managing may further include differentially providing benefits to the user in accordance with the number of official accounts of the related account group that is added to friends by the user.

The managing may further include separately displaying official accounts, which are classified into the related account group in a list where the official accounts are arranged, with other official accounts belonging to the list.

The managing may further include inclusively displaying other official accounts of a corresponding group if at least one official account belonging to the related account group is included in a search result while searching the official accounts.

Example embodiments of the present inventive concepts include a computer-readable recording medium including instructions allowing a computer system to manage accounts on a messenger, the instruction causing the computer system to be controlled in a method comprising: setting a relation between official accounts that are accounts of sponsors on a messenger; and managing the official accounts by classifying the official accounts in a related account group in accordance with the relation between the official accounts.

Example embodiments of the present inventive concepts include an official account management system comprising: a processor configured to set a relation between official accounts that are accounts of sponsors on a messenger; and manage the official accounts by classifying the official accounts in a related account group in accordance with the relation between the official accounts.

The processor may be configured to allocate a code identifier, which indicates the relation between the official accounts in accordance with at least one of marketing agreement, state and district, business category, family brand between sponsors, to each of the official accounts.

The processor may be configured to propose another official account of a corresponding group to a user if the user adds a specific official account belonging to the related account group to a friend list.

The processor may be configured to propose another official account of a corresponding group to a user if a specific official account belonging to the related account group is included in a friend list of the user.

The processor may be configured to exclude an official account, which belongs to the related account group and has been refused by the user for friend addition, from targets of proposal.

The processor may be configured to provide a benefit to the user if the user adds official accounts of the related account group in a number larger than a predetermined number to friends.

The processor may be configured to separately display official accounts, which are classified into the related account group in a list where the official accounts are arranged, with other official accounts belonging to the list.

The processor may be configured to inclusively display other official accounts of a corresponding group if at least one official account belonging to the related account group is included in a search result while searching the official accounts.

BRIEF DESCRIPTION OF THE FIGURES

FIGS. 5 to 8 illustrate example processes of friend addition with official accounts of family brands in example embodiments of the inventive concepts.

DETAILED DESCRIPTION

Figure 1:
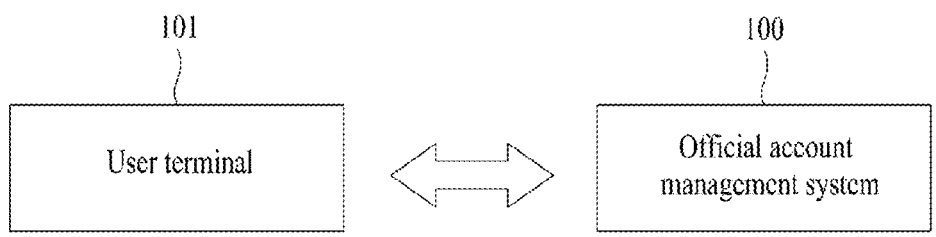
FIG. 1 is a block diagram illustrating a schematic configuration between a user terminal and an official account management system in an example embodiment of the inventive concepts.

The inventive concepts will now be described more fully hereinafter with reference to the accompanying drawings, in which example embodiments of the inventive concepts are shown. The advantages and features of the inventive concepts and methods of achieving them will be apparent from the following example embodiments that will be described in more detail with reference to the accompanying drawings. It should be noted, however, that the inventive concepts are not limited to the following example embodiments, and may be implemented in various forms. Accordingly, the example embodiments are provided only to disclose the inventive concepts and let those skilled in the art know the category of the inventive concepts. In the drawings, example embodiments of the inventive concepts are not limited to the specific examples provided herein and are exaggerated for clarity.

The terminology used herein is for the purpose of describing example embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, example embodiments in the detailed description will be described with sectional views as ideal example views of the inventive concepts. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some example embodiments could be termed a second element in other example embodiments without departing from the teachings of the present invention. Example embodiments of aspects of the present inventive concepts explained and illustrated herein include their complementary counterparts. The same reference numerals or the same reference designators denote the same elements throughout the specification.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

As appreciated by the present inventive entity, devices and methods of forming devices according to various example embodiments described herein may be embodied in microelectronic devices such as integrated circuits, wherein a plurality of devices according to various example embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various example embodiments described herein may include a plurality of the devices in an array and/or in a two-dimensional pattern that is based on the functionality of the microelectronic device.

The devices according to various example embodiments described herein may be interspersed among other devices depending on the functionality of the microelectronic device. Moreover, microelectronic devices according to various example embodiments described herein may be replicated in a third direction that may be orthogonal to the two different directions, to provide three-dimensional integrated circuits.

Accordingly, the cross-sectional view(s) illustrated herein provide support for a plurality of devices according to various example embodiments described herein that extend along two different directions in a plan view and/or in three different directions in a perspective view. For example, when a single active region is illustrated in a cross-sectional view of a device/structure, the device/structure may include a plurality of active regions and transistor structures (or memory cell structures, gate structures, etc., as appropriate to the case) thereon, as would be illustrated by a plan view of the device/structure.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Example embodiments of the inventive concepts relate to technology of managing official accounts in a messenger, and more particularly, to a method, system and recording medium inducing friend addition based on relations between the official accounts.

In description below, the term "official account" may be used as meaning a bot-type account which provides a variety of information involved in a sponsor, for example, a brand, a company, an artist, an entertainer, media, and so on, and may be publicized and proposed to all users who use a messenger. Additionally, the term "official account" as used herein may mean accounts which are automatically proposed to a user, who uses a messenger, to allow the user to add the accounts as other users for talks. For example, such an "official account" may include an account proposed to users who match with a demo condition such as age, sex, and so on, or an account proposed to users who input codes given through a variety of paths in an on-line or off-line environment.

FIG. 1 is a block diagram illustrating a schematic configuration between a user terminal and an official account management system in an example embodiment of the inventive concepts. FIG. 1 shows an official account management system 100 and a user terminal 101. The arrow of FIG. 1 may indicate that data can be transceived (transmitted and received) through a wired/wireless network between the official account management system 100 and the user terminal 101.

The user terminal 101 may be, for example, a PC, a laptop computer, a smart phone, a tablet computer, a wearable computer, and so on, indicating one of all kinds of terminals capable of connecting with web/mobile sites relevant to the official account management system 100 or installing and executing application for services. Thus, the user terminal 101 may perform general service operations, such as service screen formation, data input, data transception (transmission and reception), data storage, and so on, under control of a web/mobile site or a specialized application.

The official account management system 100 may be implemented on a messenger platform to offer a messenger service, and may provide an environment to manage official accounts on the messenger for the user terminal 101 as a client using the messenger service. During this, the official account management system 100 may provide functions of searching official accounts, adding friends, and proposing friends on the messenger. Especially, the official account management system 100 may induce friend addition of official accounts based on relations between the official accounts.

The official account management system 100 may be included in a platform of a messenger server (not shown) which offers a messenger service, but example embodiments of the inventive concepts may not be restrictive hereto. The official account management system 100 may be also implemented independent from a messenger server and then formed to manage official accounts through cooperation with the messenger server. Additionally, the official account management system 100 may be implemented in an application where at least one element is installed in the user terminal 101, or included in platform to provide a service under a client-server environment.

Figure 2:
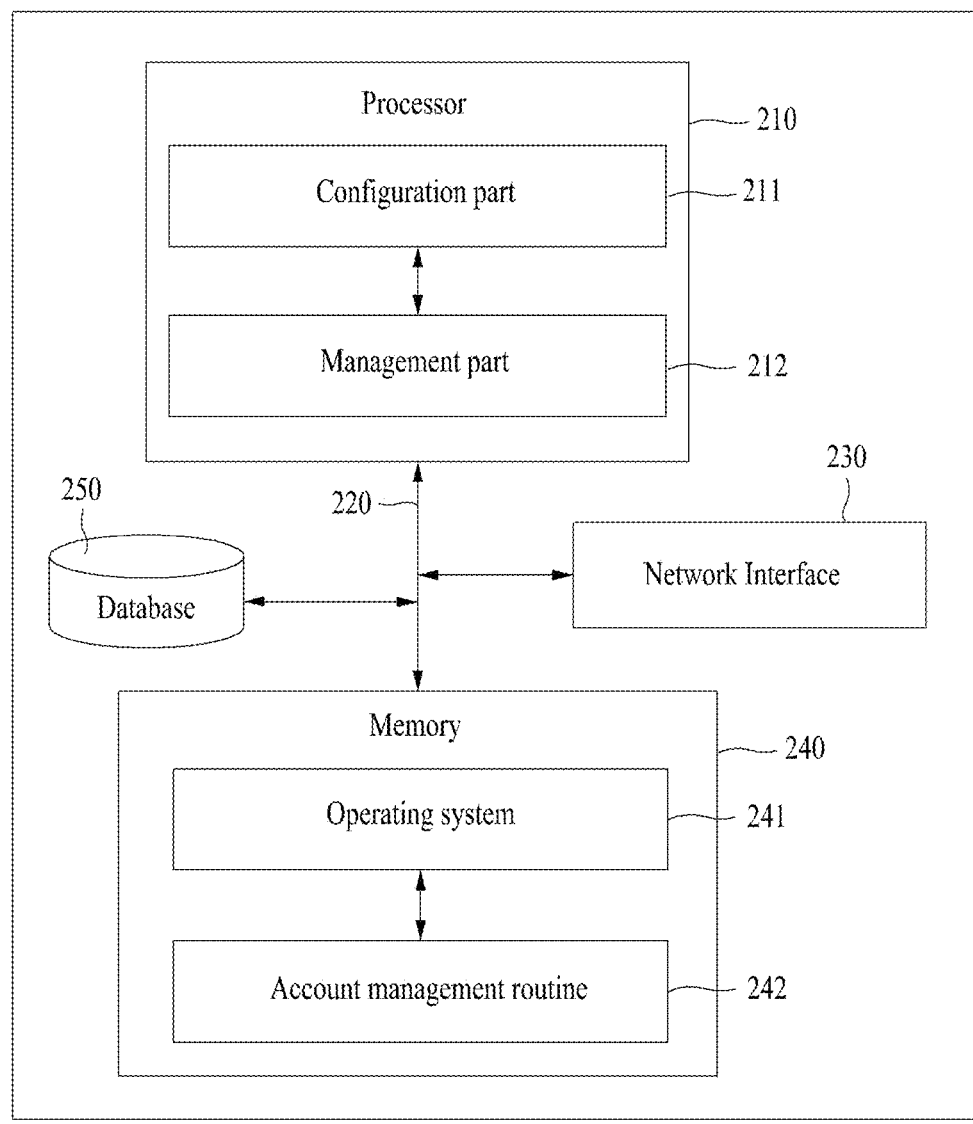
FIG. 2 is a block diagram illustrating an internal configuration of an official account management system in an example embodiment of the inventive concepts.
Figure 3:
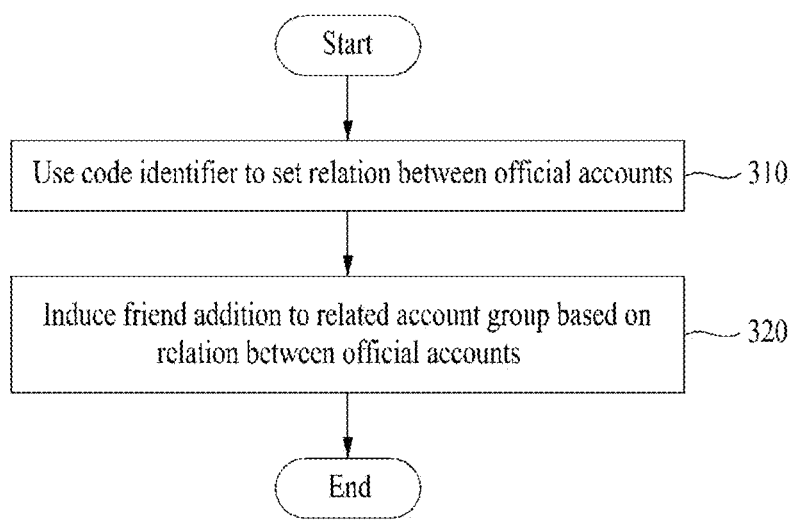
FIG. 3 is a flow chart showing an official account management method in an example embodiment of the inventive concepts.

FIG. 2 is a block diagram illustrating an internal configuration of an official account management system in an example embodiment of the inventive concepts, and FIG. 3 is a flow chart showing an official account management method in an example embodiment of the inventive concepts.

The official account management system 200 according to an example embodiment may include a processor 210, a bus 220, a network interface 230, a memory 240, and/or a database 250. The memory 240 may include an operation system 241 and an account management routine 242. The processor 210 may include a configuration part 211 and a management part 212. In other example embodiments, the official account management system 200 may even further include elements more than those of FIG. 2. However there may not be in need of illustrating almost general elements herein. For example, the official account management system 200 may even include other elements such as display or transceiver (transmitter and receiver).

The memory 240, as a computer-readable recording medium, may include a Random Access Memory (RAM), or a permanent mass storage device such as Read-Only Memory (ROM) and disk drive. Additionally, the memory 240 may store program codes for the operating system 241 and the account management routine 242. These software elements may be loaded from an additional computer-readable recording medium independent from the memory 240 by using a drive mechanism (not shown). Such an additional computer-readable recording medium (not shown) may include a floppy disk, a disk, a tape, a DVD/CD-ROM drive, or a memory card. In another embodiment, software elements may be loaded into the memory 240 through the network interface 230 not through a computer-readable recording medium.

The bus 220 may allow communication and data transmission between elements of the official account management system 200. The bus 220 may be formed using a high-speed serial bus, a parallel bus, a Storage Area Network (SAN) and/or other pertinent communication skills.

The network interface 230 may be a computer hardware element for connecting the official account management system 200 with a computer network. The network interface 230 may connect the official account management system 200 with a computer network through a wireless or wired network.

The database 250 may act to store and retain all information necessary for official account management, such as official account lists, official account related information. The account-related information may include company names respective to official accounts, business category information, location information, code identifiers indicating relations with other official accounts. While FIG. 2 illustrates as the data base 250 is built in the official account management system 200, example embodiments of the inventive concepts may not be restrictive hereto. The database 250 may be excluded therefrom in accordance with a system configuration or an environmental condition, or also disposed entirely or partly on a different system as an external database.

The processor 210 may be configured to process computer program instructions by performing basic arithmetic operations, logical operations, and input/output operations of the official account management system 200. Instructions may be provided to the processor 210 through the bus 220 by the memory 240 or the network interface 230. The processor 210 may be formed to execute program codes for the configuration part 211 and the management part 212. These program codes may be stored in a recording device such as the memory 240.

The configuration part 211 and the management part 212 may be formed to perform operations 310 and 320 of FIG. 3.

At operation 310, the configuration part 211 may set relations between official accounts by using code identifiers which are predetermined and/or desired. The code identifiers may indicate the relation between the official accounts. In other words, the configuration part 211 may set relations between official accounts by identifying the code identifiers and analyzing them. In another embodiment, the relation between the official accounts may be set based on analysis and/or comparison for at least one of marketing agreement, state and district, business category, family brand between the sponsors.

For example, the configuration part 211 may allocate code identifiers, which denote family brands of companies corresponding thereto, respectively to official accounts of brands for companies, which possess two or more brands, to designate the official accounts as belonging to a related account groups corresponding to the family brands. As another example, the configuration part 211 may allocate inherent code identifiers respectively to official accounts of companies, which are involved in marketing agreements, to designate the official accounts as belonging to a related account group which is predetermined and/or desired in agreement. As still another example, the configuration part 211 may allocate code identifiers, which denote business categories, respectively to official accounts to designate the official accounts as belonging to a related account group by the business categories. Otherwise, the configuration part 211 may allocate code identifiers, which denote states (or districts), respectively to official accounts to designate the official accounts as belonging to a related account group by the states (or districts). The code identifiers may even include identifier information of official accounts, and may be even stored in a form capable of matching with identifier information of official accounts.

Accordingly, the configuration part 211 may use code identifiers, according to relations between official accounts, to group official accounts of family brands, official accounts of business categories, official accounts of states, and official accounts with marketing agreement. Additionally, a relation between official accounts, which acts as a reference for grouping official accounts, may be designated by combining or extending two or more references in various classes.

At operation 320, the management part 212 may induce friend addition to a related account group based on a relation between official accounts. For example, when a specific official account is added to a friend list, the management part 212 may propose another official account of a related account group, which includes the specific official account, as a target of proposal for friend addition. As another example, if a specific official account is preliminarily added to a friend list, the management part 212 may use a push mode to propose another official account of a related account group, which includes the specific official account, as a target of proposal for friend addition.

The management part 212 may provide additional benefits to a user who adds official accounts, which are proposed as a related account group, to his friends. For example, the management part 212 may provide a benefit to a user if the user adds official accounts of a related account group to his friends in a number larger than a predetermined and/or desired number. The management part 212 may provide differential benefits to users in accordance with the number of official accounts which are added to their friends in a related account group.

Additionally, the management part 212 may record and manage user logs, which refuse to add official accounts of a related account group to friends, by users. A list of official accounts, which have been refused the friend addition, may be specially managed respectively for users. Therefore, the management part 212 may exclude official accounts, which are refused friend addition by a user, later from targets of proposal for friend addition.

Additionally, the management part 212 may manage official accounts, based on relations between the official accounts, in the unit of group. For example, the management part 212 may separately indicate official accounts, which are classified in a related account group, differently from other official accounts by user interface (UI). As another example, if at least a part of official accounts belonging to a related account group are included in a search result while searching the official accounts, the management part 212 may indicate other official accounts of the related account group along with the search result.

Hereinafter, an example embodiment will be now described in detail to regard family brand official accounts for a related account group as a representative example. Family brand official accounts may be grouped in relation between a parent company and an affiliated company, and between affiliated companies. Therefore, a related account group may be utilized in marketing to vertically classes or the same class.

Figure 4:
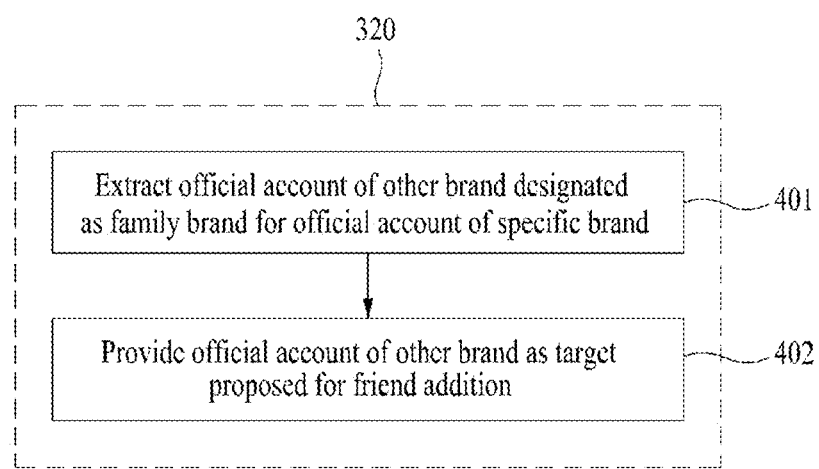
FIG. 4 is a flow chart showing a process of proposing an official account of a family brand in an example embodiment of the inventive concepts.

FIG. 4 is a flow chart showing a process of proposing an official account of a family brand in an example embodiment of the inventive concepts. Each operation of the process of proposing an official account according to an example embodiment of the inventive concepts may be performed by the management part 212 described above in conjunction with FIG. 2.

At operation 401, the management part 212 may extract an official account of another brand which is designated as a family brand for an official account of a specific brand which is added to friends by a user. During this, the management part 212 may use a code identifier of the official account, which is added by the user, to identify a related account group designated as the family brand, and extract an official account of another brand from the related account group.

At operation 402, the management part 212 may provide the official account of another brand, which is extracted in the operation 401, to the user as a target of proposal for friend addition. For example, the management part 212 may propose an official account of another brand of the same group together for friend addition when a user adds an official account of a specific brand. As another example, the management part 212 may propose an official account of another brand of the same group to a user, who is in friendship with a specific brand, in a push mode at a predetermined and/or desired time (e.g., in a constant period) after the user adds an official account of the specific brand. Proposal of official account by the push mode may allow a user to propose an official account of another brand through an official account which is previously added to friends of the user in family brands. The management part 212 may exclude an official account, which has been refused by a user for friend addition, among official accounts of another brand which are extracted in operation 401 based on user logs relevant to intention of friend addition, from a target of proposal for friend addition.

According to an example embodiment, for a family brand as a related account group in friend addition with official accounts, the official accounts of the group may be mutually proposed by a crossing relation between brands.

FIGS. 5 to 8 illustrate example processes of friend addition with official accounts of family brands in example embodiments of the inventive concepts.

Figure 5:
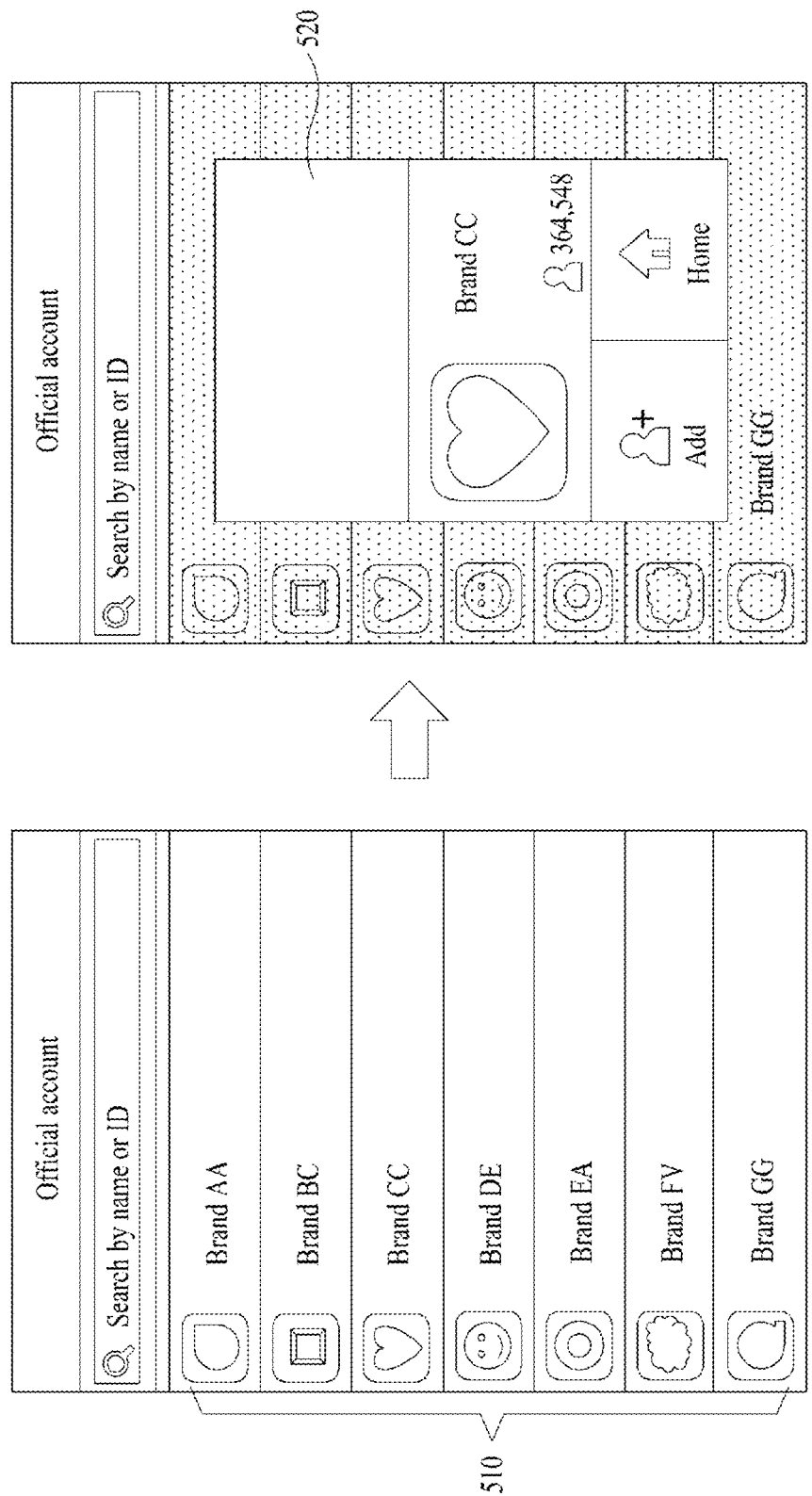

FIG. 5 shows an official account list 510 provided on a messenger. A user may select a specific brand, for example, "Brand CC", which is to be added to friends of the official account list 510, and then a friend addition screen 520 about the specific brand "Brand CC" selected by the user may be displayed in the messenger.

As shown in FIG. 6 about the specific brand "Brand CC" selected by the user, it is assumed that a code identifier "XXX" is commonly allocated to "Brand CV", "Brand DK", "Brand XC", "Brand XX", and "Brand XY" which are included in a family brand as a related account group.

Figure 7:
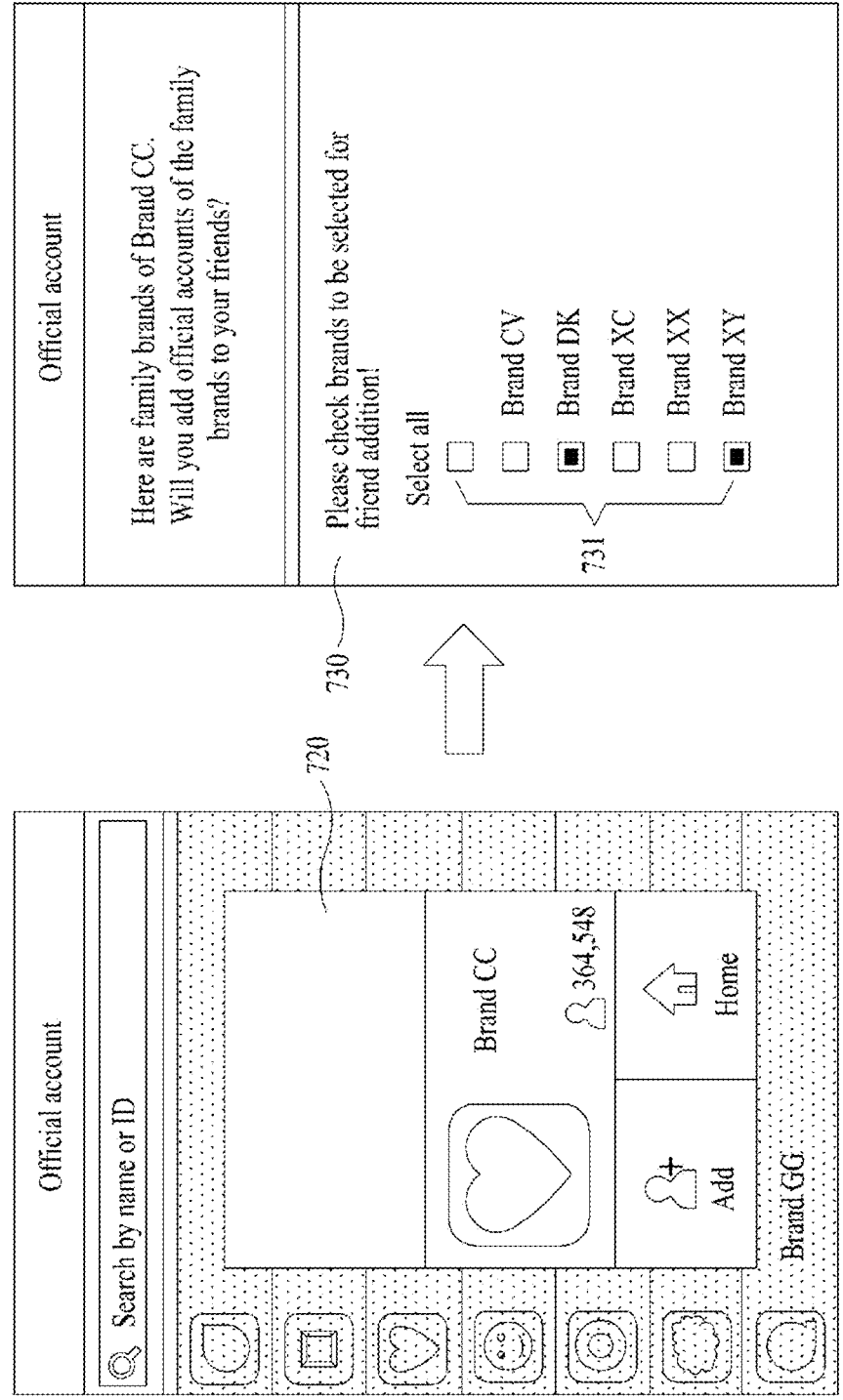

Referring to FIG. 7, if the user requests friend addition through an official account friend addition screen for "Brand CC", a family brand proposal screen 730 may be displayed in the messenger as an official account proposal screen for inducing friend addition to the family brand.

The rest of family brands except "Brand CC" which is requested by the user for friend addition may be included in the family brand proposal screen 730. A selection function 731 may be provided to respectively select family brands by brand, or entirely select all of the family brands.

Figure 8:
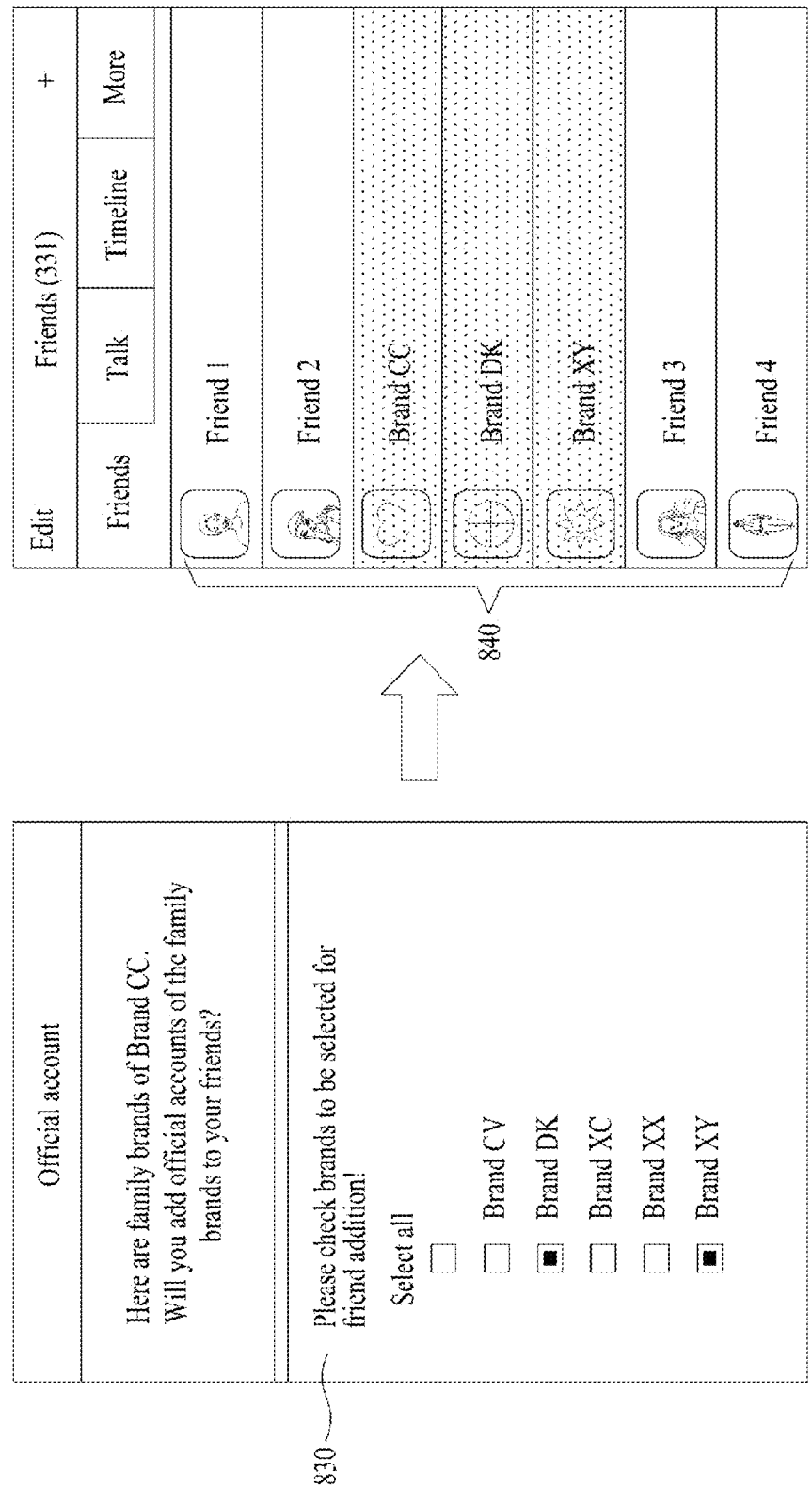

For example, as shown in FIG. 8, if a user selects "Brand DK" and "Brand XY" from family brands of "Brand CC" in a family brand proposal screen 830, "Brand DK" and "Brand XY" may be added in a group to a friend list 840 of the use along with "Brand CC".

Figure 9:
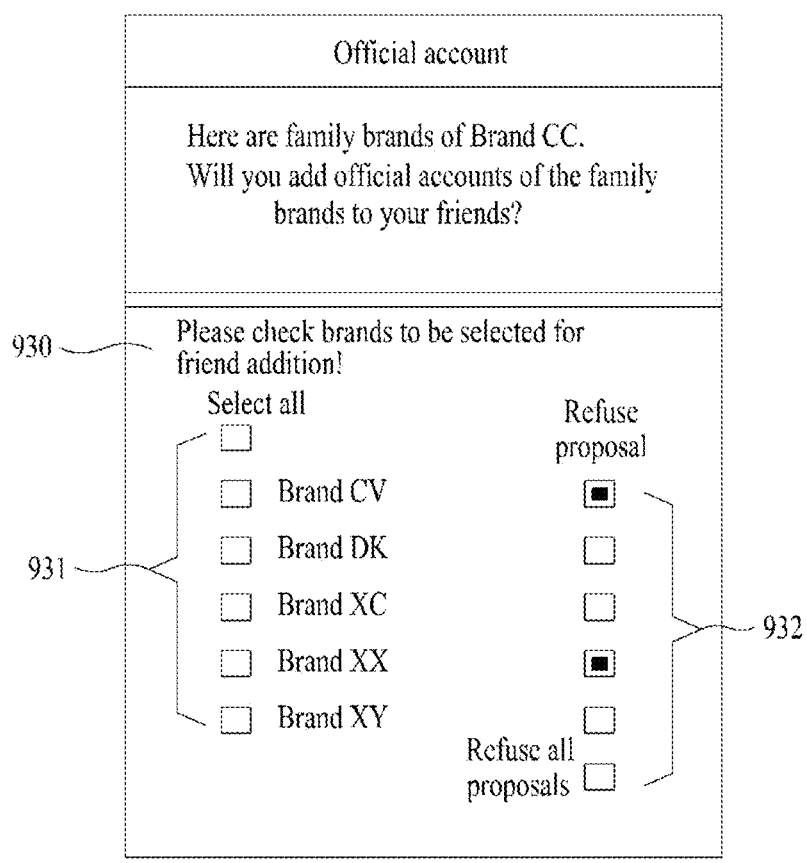
FIG. 9 illustrates an example screen for inputting an intention to proposals about family brands in an example embodiment of the inventive concepts.

FIG. 9 illustrates an example screen for inputting an intention to proposals about family brands in an example embodiment of the inventive concepts.

Unless a family brand is coincidently added thereto at a time of adding a specific brand, it may be permissible to propose the family brand later by the push mode through the specific brand which is previously added to friends of a user. However, an official account, which has been previously refused by a user for friend addition, may be excluded from targets of proposal through special management.

Referring to FIG. 9, a messenger may provide a family brand proposal screen 930 for a specific brand which is requested by a user for friend addition. It may be allowable to provide an input function 932 for inputting a user's intention whether to accept a proposal about family brand, along with a selection function 931 for selecting a family brand to be added with a specific brand through the brand proposal screen 930.

In this regard, the input function 932 may input intention of refusing a proposal, which indicates not to execute friend addition even later, for a family brand which has not been ever selected by the selection function 931. The input function 932 may include a function of respectively inputting proposal refusing intention by brand, and a function of inputting proposal refusing intention to all brands by one click. Accordingly, the messenger may manage official accounts, which correspond to proposal refusing intention of the user, in a special list, and exclude the refused official accounts from targets of proposal for family brands.

For example, regarding to the family brand shown in FIG. 6 where "Brand CC", "Brand CV", "Brand DK", "Brand XC", "Brand XX", and "Brand XY" are mutually proposed while adding official accounts to friends in crossing relation, if a user inputs proposal refusing intention for "Brand CV" and "Brand XX", the rest of brands may be selected except "Brand CV" and "Brand XX" from targets of proposal for the family brand while proposing official accounts in the family brand.

Figure 10:
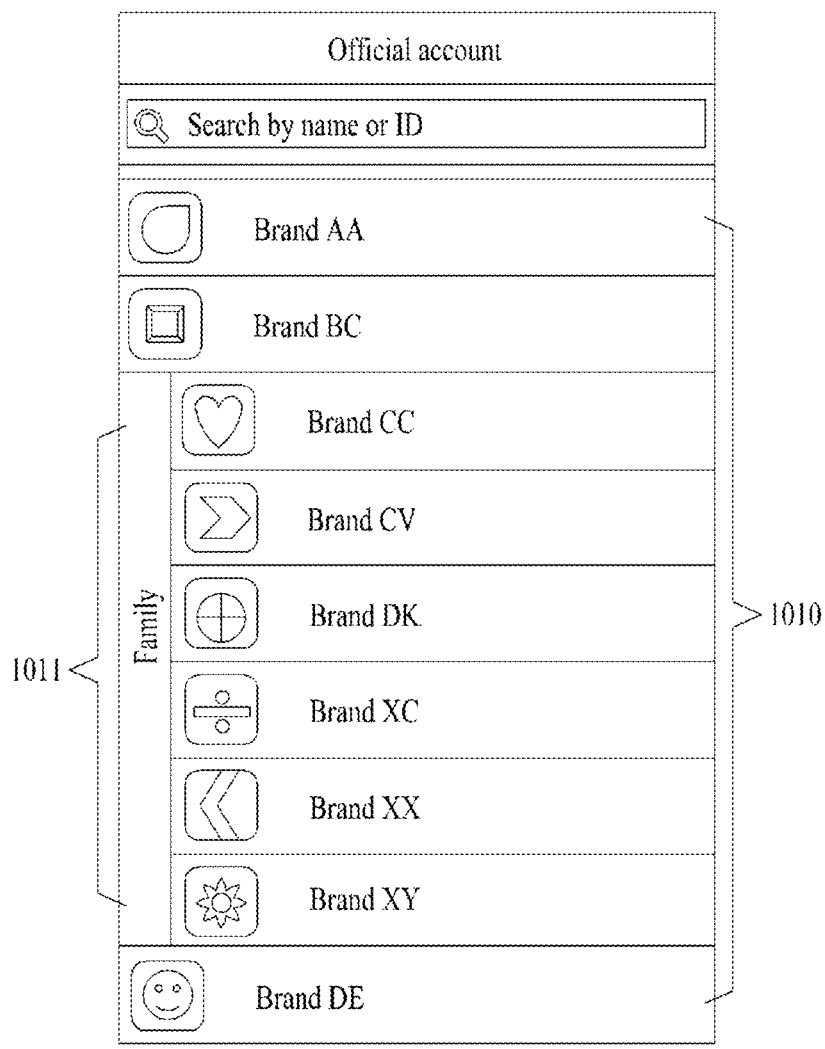
FIGS. 10 to 12 illustrate example screens for separately displaying family brands on an official account list in an example embodiment of the inventive concepts.
Figure 11:
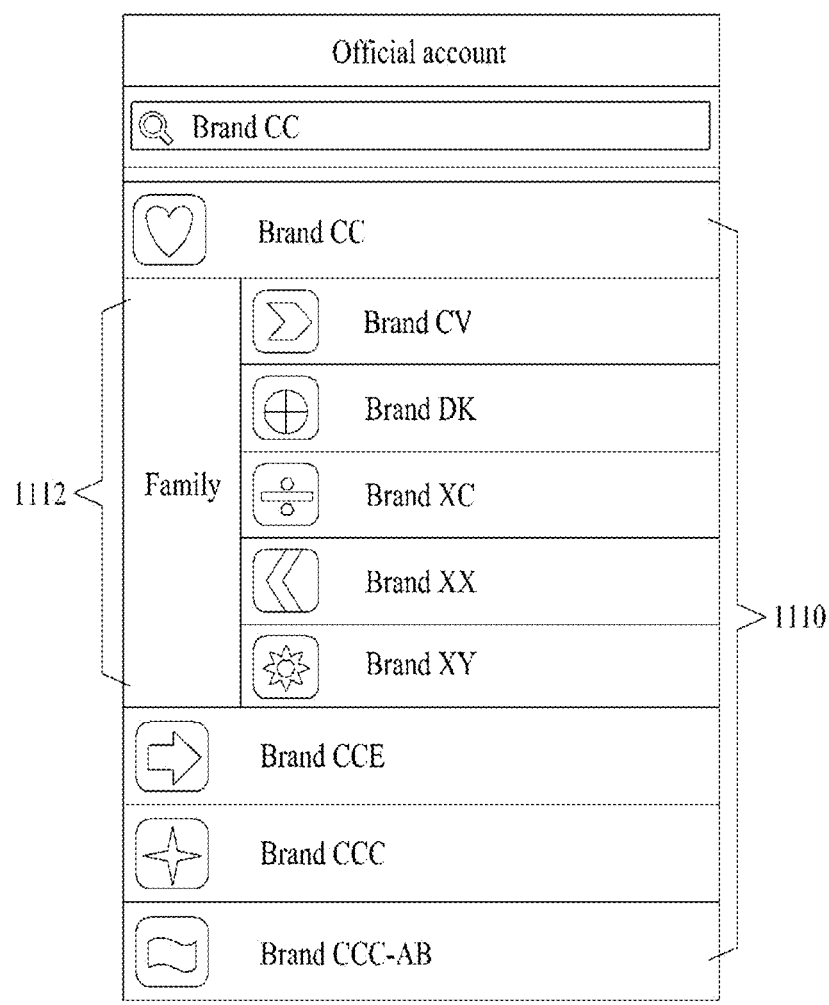
Figure 12:
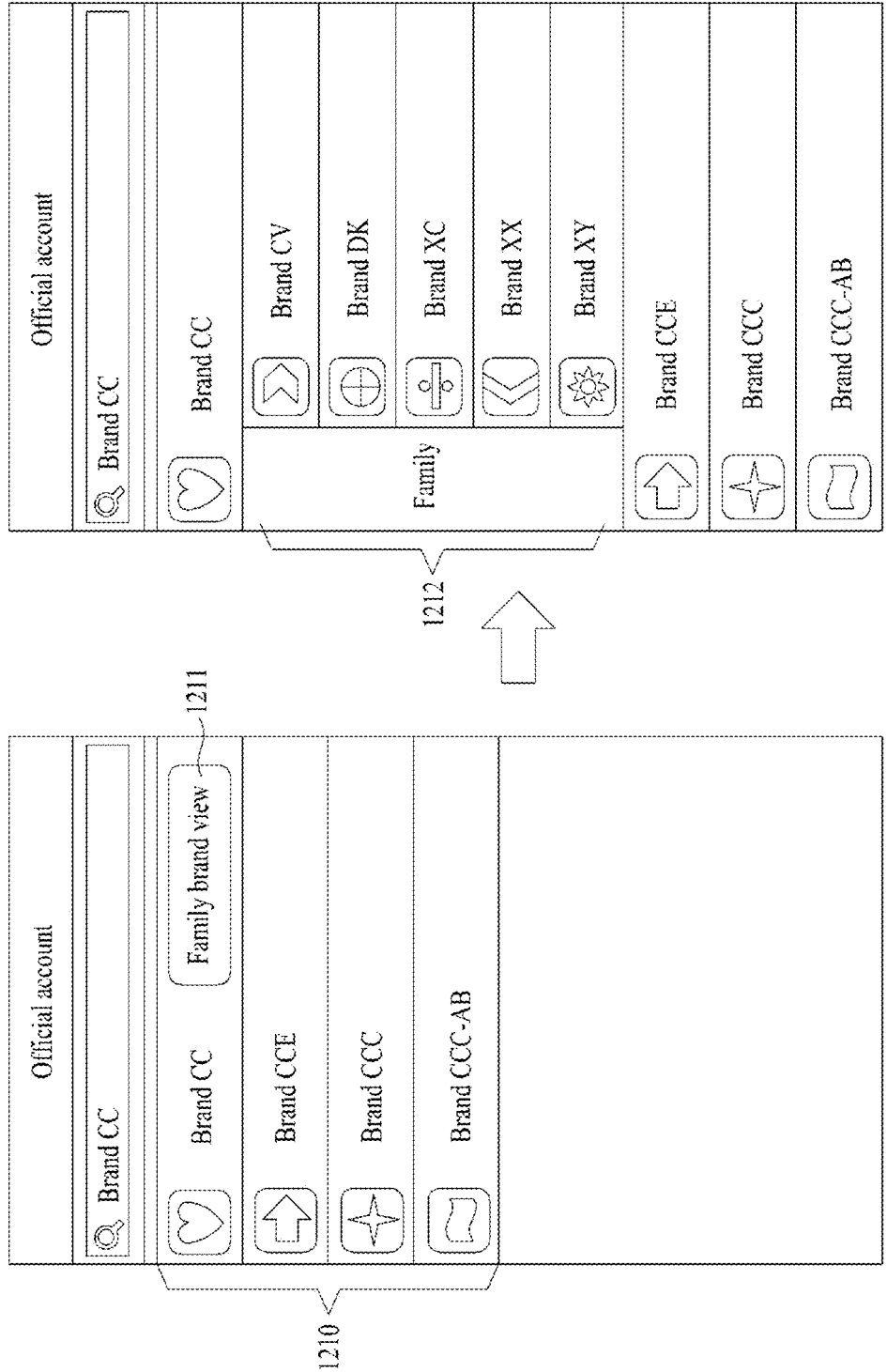

FIGS. 10 to 12 illustrate example screens for separately displaying family brands on an official account list in an example embodiment of the inventive concepts.

FIG. 10 shows an example of the official account list 1010 which is provided on a messenger. As shown in FIG. 10, in the official account list 1010, a relayed account group 1011 relative to a family brand may be separately displayed with other official accounts which are included in the list. To allow a user to recognize relations between official accounts, the official accounts 1011 grouped along with family brands on the official account list 1010 may be displayed differently by user interface.

FIG. 11 shows a search result by using "Brand CC" as a keyword in the official account list. As shown in FIG. 11, if a user inputs the keyword "Brand CC" for search, a search result 1110 for "Brand CC" may be provided corresponding to the input. For the official account "Brand CC" included in the search result 1110, it may be permissible to inclusively display "Brand CC" and a related account group 1112 in the search result 1110.

As another example, as shown in FIG. 12, after first displaying a "family brand view" menu 1211 as an additional user interface (UI) for identifying a family brand in items of an official account "Brand CC" having the family brand from a search result for "Brand CC", the official account "Brand CC" and a related account group 1212, which is designated as the family brand, may be displayed in spread when a user selects the "family brand view" menu 1211.

In summary, if at least one of family brands is searched on an official account list in a messenger, official accounts belonging to the searched family brand, that is a related account group, may be provided and displayed along with a search result.

A method of separately displaying a related account group on an official account list may be applied with various display elements but the aforementioned examples, and modified in various ways.

While the aforementioned example embodiments are described with regard to screens executed in a mobile terminal (FIG. 5, FIGS. 7 to 12), those may be simply illustrated to help understanding of the inventive concepts. Example embodiments of the inventive concepts may not be restrictive to those example embodiments and may be also available in a web site environment for general PCs, being modifiable in screen formation, order, and other configurations.

Figure 13:
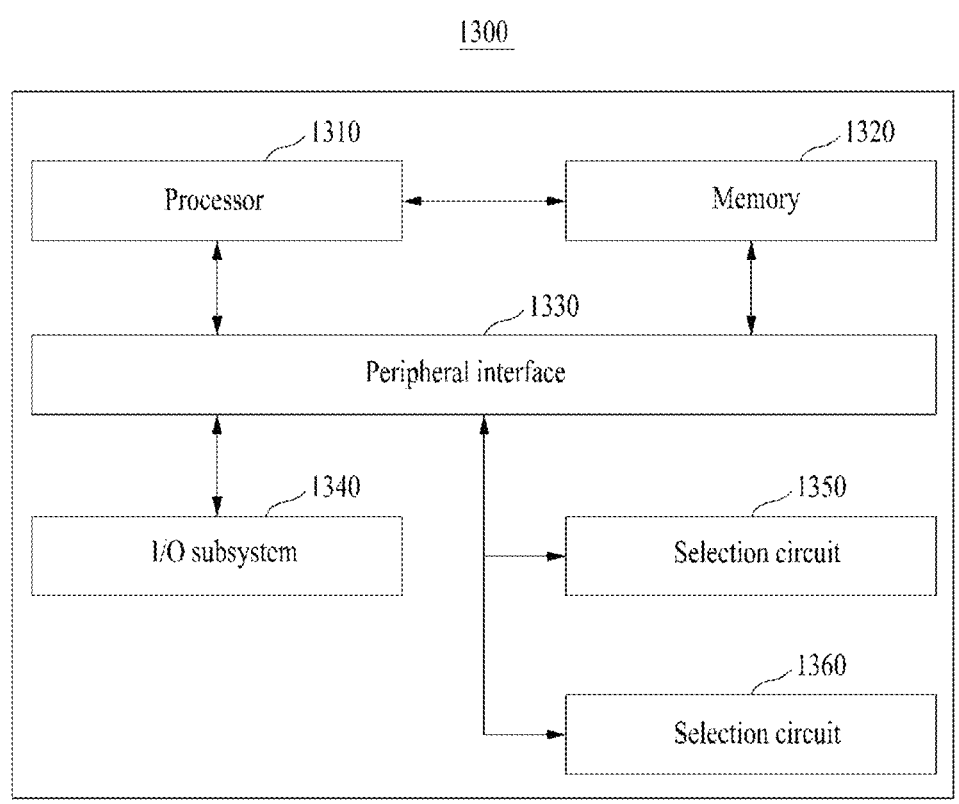
FIG. 13 is a block diagram illustrating an example internal configuration of a computer system in an example embodiment of the inventive concepts.

FIG. 13 is a block diagram illustrating an example internal configuration of a computer system in an example embodiment of the inventive concepts.

As shown in FIG. 13, the computer system 1300 may include at least one processor 1310, a memory 1320, a peripheral interface 1330, an input/output subsystem 1340, a power circuit 1350, and/or a communication circuit 1360. In this configuration, the computer system 1300 may correspond to a user terminal.

The memory 1320 may include, for example, a high-speed random access memory, a magnetic disk, an SRAM, a DRAM, a ROM, a flash memory, or a nonvolatile memory. The memory 1320 may include a software module, an instruction group, or other various data necessary for an operation of the computer system 1300. In this configuration, accessing the memory 1320 from a foreign component such as the processor 1310 or the peripheral interface 1330 may be controlled by the processor 1310.

The peripheral interface 1330 may couple input and/or output peripheral devices of the computer system 1300 with the processor 1310 and the memory 1320. The processor 1310 may execute software modules or instruction groups, which is stored in the memory 1320, to perform various functions and process data.

The input/output subsystem 1340 may couple a variety of input/output peripheral devices with the peripheral interface 1330. For instance, the input/output system 1340 may include a controller for coupling peripheral devices, such as a monitor, a keyboard, a mouse, printer, or in need, a touch screen, or a sensor, with the peripheral interface 1330. According to another embodiment, the input/output peripheral devices may be coupled with the peripheral interface 1330 without through the input/output subsystem 1340.

The power circuit 1350 may supply power entirely or partly to components of a terminal. For example, the power circuit 1350 may include a power management system, one or more power sources such as battery or AC source, a charging system, a power failure detection circuit, a power converter or inverter, a power state indicator, or other components for generating, managing, and distributing power.

The communication circuit 1360 may use at least one of external ports to allow communication with another computer system. Otherwise, as aforementioned, the communication circuit 1360 may include an RF circuit, in need, to transceive (transmit and receive) an RF signal which is known as an electromagnetic signal, even allowing communication with another computer system.

The example embodiment of in FIG. 13 is merely shown as an example of the computer system 1300. The computer system 1300 may be formed without a part of the components shown in FIG. 13, further comprised of an additional component which is not shown in FIG. 13, or formed to have a configuration or arrangement coupling two or more components. For example, a computer system for a communication terminal in a mobile environment may further include even a touch screen or sensor, or include a circuit for RF communication with various communication modes (WiFi, 3G, LTE, Bluetooth, NFC, Zigbee), in addition to the components shown in FIG. 13. Components includable in the computer system 1000 may be practiced in hardware including an integrated circuit specialized for application or process of one or more signals, software, or combinations with hardware and software.

Methods according to example embodiments of the inventive concepts may be implemented in a form of program instructions, which are executable through various types of computer systems, and recorded in a computer-readable medium. Especially, a program according to example embodiments may be made up of a PC-based program or an application for mobile terminal. A messenger app in example embodiments may be implemented in a program operating independently, or an in-app of a specific application to allow an operation on the specific application. Additionally, such an application therefor may be installed in a user terminal through a file distribution system. For example, the file distribution system may include a file transmission part (not shown) sending a file in response to a request of a user terminal.

According to example embodiments of the inventive concepts, it may be accomplishable to further improve a marketing effect through a new marketing solution using official accounts by inducing friend addition based on relations between the official accounts and interactively publicizing the official accounts of related companies.

The system described above may be implemented in hardware elements, software elements, and/or combinations with hardware and software elements. For example, systems, devices, parts, and elements described in example embodiments may be implemented using one or more general computers or specially purposed computers along with a processor, a controller, an Arithmetic Logic Unit (ALU), a digital signal processor, a microcomputer, a Field Programmable Gate Array (ALU), a Programmable Logic Unit (PLU), a microprocessor, or other unit capable of executing instructions and responding thereto. A processing unit may perform an Operating System (OS) and one or more software applications which are executed on the OS. Additionally, a processing unit may respond execution of software to even access, store, control, process, and generate data. While a processing unit is even described as operating with one member for convenience of understanding, it can be seen by those skilled in the art that the processing unit may include a plurality of processing elements and/or plural types of processing elements. For example, a processing unit may include a plurality of processors, or one processor and one controller. It may be permissible to form another processing configuration such as parallel processor.

Software may include computer programs, codes, instructions, or a combination with one or more of them, and configure or control, independently or collectively, a processing unit to operate in a desired direction. For analyzing by a processing unit and providing instructions or data to the processing unit, soft and/or data may be embodied permanently or temporarily in some machines, components, physical devices, virtual equipment, or transmitted signal waves. Software may be distributed over a computer system, which is connected with a network, and even stored or executed in the distribution mode. Software and data may be stored in one or more computer-readable recording medium.

A method according to example embodiments of the inventive concepts may be implemented in a form of program instruction, which is executable through a variety of computing means, and recorded in a computer-readable medium. The computer-readable medium may independently or collectively include program instructions, data files, data structures, and so on. Program instructions recorded in such a medium may be especially designed and configured for example embodiments of the inventive concepts, but they may be also used even by those skilled in the computer software art. A computer-readable recording medium may include a hardware unit, which is specialized to store and execute program instructions, for example, magnetic medium such as hard disk, floppy disk, or magnetic tape, optical medium such CD-ROM or DVD, magneto-optical medium such as floptical disk, and memory such as ROM, RAM, and flash memory. Program instructions may include high-class language codes, which are executable by a computer with an interpreter, as well as machine language codes made likely by a compiler. The hardware unit may be formed to operate as one or more software module for performing the operations according to embodiments of the inventive concepts, and the reverse is also same.

While the inventive concepts has been described with reference to example embodiments, it will be apparent to those skilled in the art that various changes and modifications may be made without departing from the spirit and scope of the inventive concepts set forth throughout the annexed claim matters. For example, although the aforementioned technical features are carried out in other sequences different from the manners described above, and/or the aforementioned elements, such as systems, structure, devices, and circuits, are combined or associated each other in other forms different from the described above, or replaced or substituted with other elements or equivalents, advantageous effects according to the inventive concepts may be accomplished without further endeavors.

Therefore, it should be understood that the above example embodiments are not limiting, but illustrative, hence all technical things within the annexed claims and the equivalents thereof may be construed as properly belonging to the territory of the inventive concepts.

What is claimed is:

1. An official account management method comprising:
setting, using at least one processor, in a relationship database associated with an online messenger platform, a relationship between a plurality of official accounts, the plurality of official accounts including at least a first official account and a second official account, each of the plurality of official accounts including a corresponding chatbot, the plurality of official accounts being a different account type than a user account type;
managing, using the at least one processor, the plurality of official accounts by classifying the plurality of official accounts in at least one related account group of a plurality of related account groups in accordance with the set relationship between the official accounts, each of the plurality of related account groups based on a respective relationship type of a plurality of relationship types;
managing, using the at least one processor, at least one friend relationship corresponding to a first user account, the at least one friend relationships including a friend relationship between the first user account and the first official account;
generating, using the at least one processor, a graphical user interface (GUI) of the online messenger platform associated with a first user account, the GUI including a friend GUI section, the friend GUI section including the at least one friend relationship corresponding to the first user account;
displaying, using the at least one processor, the generated GUI on a display device associated with the first user account, the displaying the generated GUI including differently displaying at least one related official account included in the related account group associated with the first official account in the friend GUI section;
receiving, using the at least one processor, a search query from the first user account, the search query including a search for a third official account;
performing, using the at least one processor, a search for official accounts corresponding to the search query; and
transmitting, using the at least one processor, a list of friend proposals to the first user account in response to the search query, the list including at least a fourth official account and at least one third related official account included in the related account group associated with the fourth official account;
wherein the transmitting the list of friend proposals causes the GUI of the online messenger platform to display the fourth official account and the at least one third related official account included in the related account group associated with the fourth official account, the list of friend proposals excluding any official accounts which have previously been refused by the first user account for friend addition.

2. The method of claim 1, wherein the differently displaying the at least one related official account includes grouping the at least one related official account with the first official account in the friend GUI section.

3. The method of claim 1, wherein the differently displaying the at least one related official account includes indenting the at least one related official account under the first official account in the friend GUI section.

4. The method of claim 1, wherein the generated GUI further includes a related official account view GUI element displayed in association with the first official account in the friend GUI section.

5. The method of claim 4, further comprising:
receiving, using the at least one processor, a user input on the related official account view GUI element; and
in response to the received user input, performing, using the at least one processor, the differently displaying the at least one related official account included in the related account group associated with the first official account in the friend GUI section.

6. The method of claim 1, further comprising:
receiving, using the at least one processor, a friend addition user input corresponding to the second official account on the GUI; and
displaying, using the at least one processor, a list of new friend proposals associated with the second official account, the list including at least one second related official account included in the related account group associated with the second official account on the GUI.

7. A non-transitory computer-readable recording medium including computer readable instructions which when executed by at least one processor included in at least one computer, causes the at least one computer to:
set in a relationship database associated with an online messenger platform, a relationship between a plurality of official accounts, the plurality of official accounts including at least a first official account and a second official account, each of the plurality of official accounts including a corresponding chatbot, the plurality of official accounts being a different account type than a user account type;
manage the plurality of official accounts by classifying the plurality of official accounts in at least one related account group of a plurality of related account groups in accordance with the set relationship between the official accounts;
manage at least one friend relationship corresponding to a first user account, the at least one friend relationships including a friend relationship between the first user account and the first official account, each of the plurality of related account groups based on a respective relationship type of a plurality of relationship types;
generate a graphical user interface (GUI) of the online messenger platform associated with a first user account, the GUI including a friend GUI section, the friend GUI section including the at least one friend relationship corresponding to the first user account;
display the generated GUI on a display device associated with the first user account, the displaying the generated GUI including differently displaying at least one related official account included in the related account group associated with the first official account in the friend GUI section;
receive a search query from the first user account, the search query including a search for a third official account;
perform a search for official accounts corresponding to the search query; and
transmit a list of friend proposals to the first user account in response to the search query, the list of friend proposals including at least a fourth official account and at least one third related official account included in the related account group associated with the fourth official account and excluding any official accounts which have previously been refused by the first user account for friend addition;
wherein the transmitting the list of friend proposals causes the GUI of the online messenger platform to display the fourth official account and the at least one third related official account included in the related account group associated with the fourth official account.

8. The non-transitory computer-readable recording medium of claim 7, wherein the differently displaying the at least one related official account includes grouping the at least one related official account with the first official account in the friend GUI section.

9. The non-transitory computer-readable recording medium of claim 7, wherein the differently displaying the at least one related official account includes indenting the at least one related official account under the first official account in the friend GUI section.

10. The non-transitory computer-readable recording medium of claim 7, wherein the generated GUI further includes a related official account view GUI element displayed in association with the first official account in the friend GUI section.

11. The non-transitory computer-readable recording medium of claim 10, wherein the at least one computer is further caused to:
receive a user input on the related official account view GUI element; and
in response to the received user input, perform the differently displaying the at least one related official account included in the related account group associated with the first official account in the friend GUI section.

12. The non-transitory computer-readable recording medium of claim 7, wherein the at least one computer is further caused to:
receive a friend addition user input corresponding to the second official account on the GUI; and
display a list of new friend proposals associated with the second official account, the list including at least one second related official account included in the related account group associated with the second official account on the GUI.

13. An official account management system comprising:
a memory having computer readable instructions stored thereon, and a relationship database associated with an online messenger platform; and
at least one processor configured to execute the computer readable instructions to:

set in a relationship database associated with an online messenger platform, a relationship between a plurality of official accounts, the plurality of official accounts including at least a first official account and a second official account, each of the plurality of official accounts including a corresponding chatbot, the plurality of official accounts being a different account type than a user account type;

manage the plurality of official accounts by classifying the plurality of official accounts in at least one related account group of a plurality of related account groups in accordance with the set relationship between the official accounts, each of the plurality of related account groups based on a respective relationship type of a plurality of relationship types;

manage at least one friend relationship corresponding to a first user account, the at least one friend relationships including a friend relationship between the first user account and the first official account;

generate a graphical user interface (GUI) of the online messenger platform associated with a first user account, the GUI including a friend GUI section including the at least one friend relationship corresponding to the first user account;

display the generated GUI on a display device associated with the first user account, the displaying the generated GUI including differently displaying at least one related official account included in the related account group associated with the first official account in the friend GUI section;

receive a search query from the first user account, the search query including a search for a third official account;

perform a search for official accounts corresponding to the search query; and transmit a list of friend proposals to the first user account in response to the search query, the list of friend proposals including at least a fourth official account and at least one third related official account included in the related account group associated with the fourth official account and excluding any official accounts which have previously been refused by the first user account for friend addition;

wherein the at least one processor is further configured to execute the computer readable instructions to transmit the list of friend proposals to cause the GUI of the online messenger platform to display the fourth official account and the at least one third related official account included in the related account group associated with the fourth official account.

14. The system of claim 13, wherein the differently displaying the at least one related official account includes grouping the at least one related official account with the first official account in the friend GUI section.

15. The system of claim 13, wherein the differently displaying the at least one related official account includes indenting the at least one related official account under the first official account in the friend GUI section.

16. The system of claim 13, wherein the generated GUI further includes a related official account view GUI element displayed in association with the first official account in the friend GUI section.

* * * * *